United States Patent [19]
Stein

[11] Patent Number: 5,900,835
[45] Date of Patent: May 4, 1999

[54] COHERENT HIDDEN MARKOV MODEL

[75] Inventor: David Stein, San Diego, Calif.

[73] Assignee: The United States of America as represented by the Secretary of the Navy, Washington, D.C.

[21] Appl. No.: 09/112,906

[22] Filed: Jul. 9, 1998

[51] Int. Cl.[6] ........................................ G01S 13/90

[52] U.S. Cl. ............................... 342/159; 342/90

[58] Field of Search ...................... 342/159, 195, 342/89, 90

[56] References Cited

U.S. PATENT DOCUMENTS 3,683,380   8/1972   Cantwell, Jr. et al. ................... 342/90

*Primary Examiner*—Ian J. Lobo
*Attorney, Agent, or Firm*—Harvey Fendelman; Michael A. Kagan; Eric James Whitesell

[57] ABSTRACT

A hidden Markov detector of the present invention comprises a hidden Markov parameter estimator for coupling to an input data source, a parameter smoother coupled to the parameter estimator, and a detection statistic calculator coupled to the parameter smoother and the input data source.

9 Claims, 3 Drawing Sheets

COHERENT HIDDEN MARKOV MODEL

LICENSING INFORMATION

The invention described below is assigned to the United States Government and is available for licensing commercially. Technical and licensing inquiries may be directed to Harvey Fendelman, Legal Counsel For Patents, Space and Naval Warfare Systems Center D0012, 53510 Silvergate Avenue, San Diego, Calif. 92152; telephone no. (619)553-3001; fax no. (619)553-3821.

BACKGROUND OF THE INVENTION

The present invention relates to signal detection in the presence of noise characterized by non-Gaussian noise models. More specifically, but without limitation thereto, the present invention relates to a signal processor for detecting targets in coherent radar return signals in the presence of non-Gaussian radar clutter.

Conventional detection algorithms derived from the assumption of Gaussian noise typically suppress heavily tailed non-Gaussian clutter by requiring higher thresholds than are required for Gaussian noise, degrading the ability of these algorithms to detect weak signals. Non-Gaussian noise may be observed if the noise is dominated by a few non-Gaussian sources, or if the noise is produced by a changing number of Gaussian or non-Gaussian sources, even if the expected number of sources is large. A variety of univariate and multivariate probability distributions have been proposed to model various types of non-Gaussian data including D. Middleton's class A and B models, K, Weibull, log-normal and discrete Guassian mixture distributions. The compound random variable, $Z=AX$ where $A>0$ and X has a normal distribution, has a class A, K, or discrete Gaussian mixture distribution if A has a Poisson, Gamma, or discrete distribution, respectively. Likelihood ratio and locally optimum detection algorithms based on non-Gaussian noise models have been developed for various signal types. Theoretical and empirical studies demonstrate that these algorithms have a significant performance improvement over corresponding detection algorithms derived from the assumption that the noise data have normal distributions. In applications such as radar, A may be correlated.

A continued need exists for a coherent radar detector having an improved capability for detecting weak radar return signals in the presence of non-Gaussian noise clutter.

SUMMARY OF THE INVENTION

A coherent hidden Markov detector of the present invention is directed to overcoming the problems described above, and may provide further related advantages. No embodiment of the present invention described herein shall preclude other embodiments or advantages that may exist or become obvious to those skilled in the art.

A hidden Markov detector of the present invention comprises a hidden Markov parameter estimator for coupling to an input data source, a parameter smoother coupled to the parameter estimator, and a detection statistic calculator coupled to the parameter estimator and the input data source.

An advantage of the coherent hidden Markov detector of the present invention is improved performance over Doppler processors in non-Gaussian and non-stationary noise environments.

Another advantage is that the present invention allows for the noise clutter level to fluctuate over the duration of the time series being analyzed.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Sea clutter amplitude is often modeled as a compound random variable defined as the product of a positive random variable and a Rayleigh distributed random variable. If the positive random variable is modeled as a finite Markov process, the compound random variable may be described by a hidden Markov model (HMM).

The coherent hidden Markov detector of the present invention is suitable for applications for which the clutter spectrum may be assumed to be substantially white. This condition may be realized by sampling relatively slowly, for example about 64 pulses per second, such that in the Fourier domain the clutter is aliased across the frequency bins.

Figure 1:
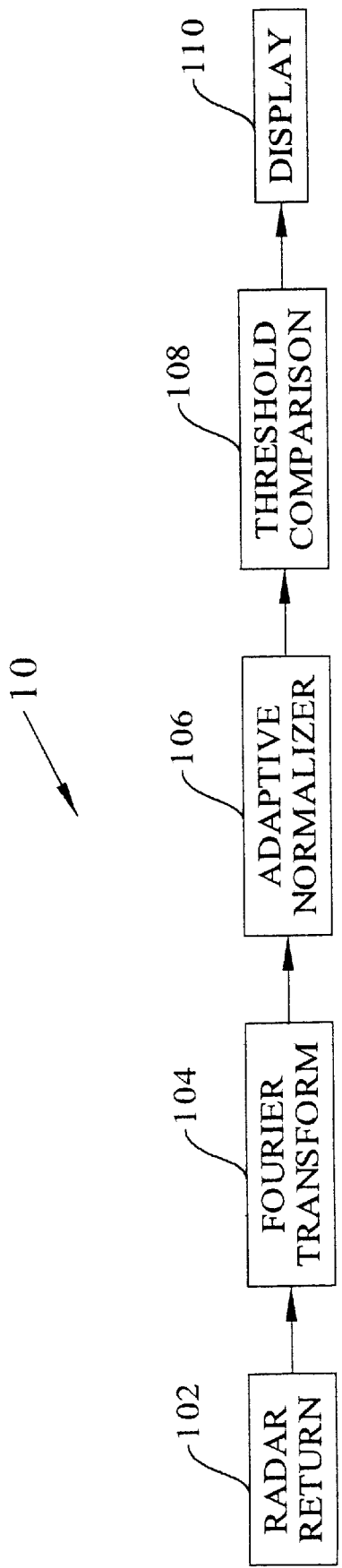
FIG. 1 is a block diagram of a typical doppler detector of the prior art.

FIG. 1 is a block diagram of a typical doppler detector 10 of the prior art for a coherent radar system. Radar return data 102 is partitioned into range bins and input to a Fourier transform 104. The Fourier coefficients are magnitude squared for each range bin, optionally computed with zero padding to reduce scalloping losses, and normalized by an estimate of the noise power by an adaptive normalizer 106. The normalized magnitudes of the Fourier coefficients are then compared to a threshold by a threshold comparator 108 and the normalized magnitudes that exceed the threshold indicating the presence of a target are output to a display 110.

Figure 2:
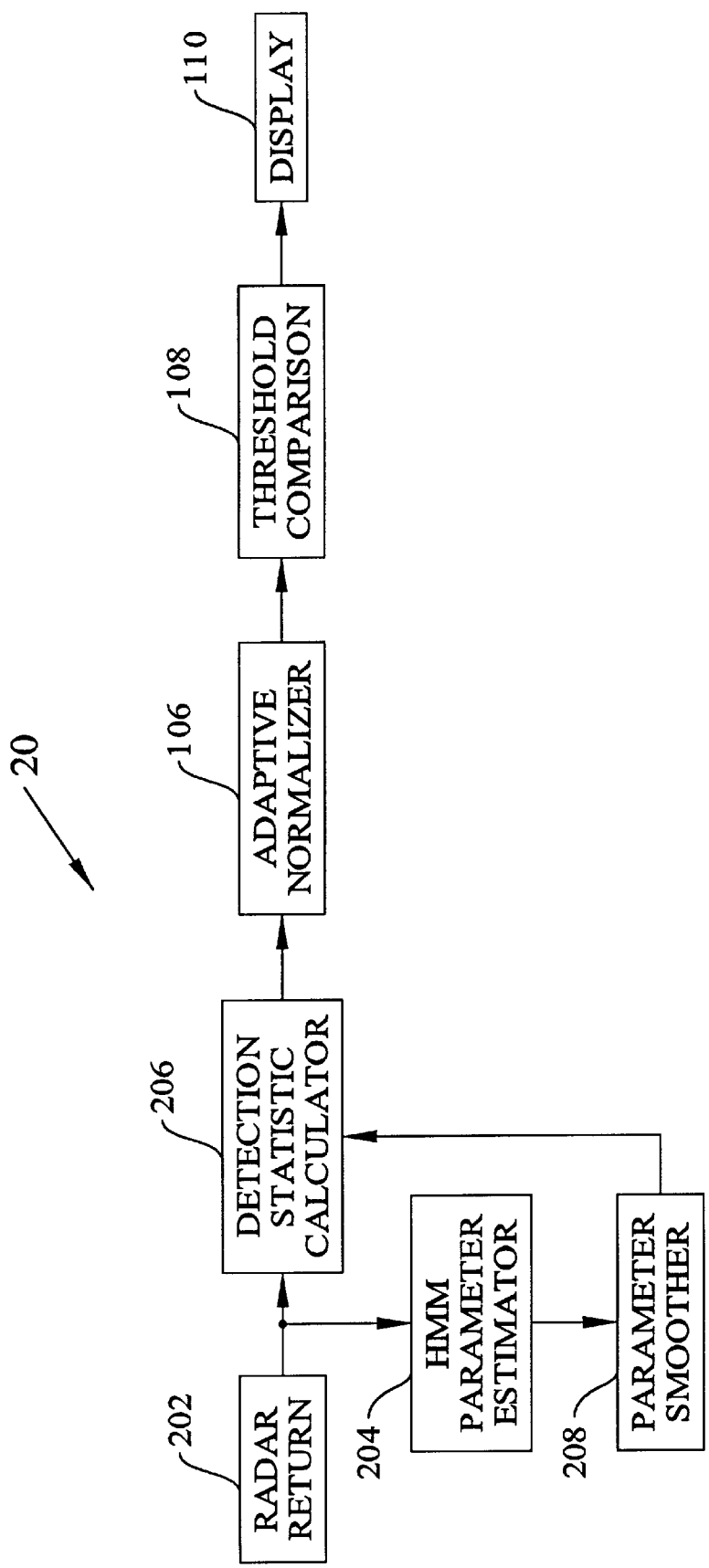
FIG. 2 is a block diagram of a hidden Markov detector of the present invention.

FIG. 2 is a block diagram of a hidden Markov detector 20 of the present invention. Radar return data 202 is partitioned into blocks of range bins and input to a hidden Markov model (HMM) parameter estimator 204 and a detection statistic calculator 206. HMM parameter estimator 204 estimates hidden Markov parameters for each block of range bins using the expectation and maximization algorithm (EM) according to techniques that are well known in the art. The number of states of the Markov model may be denoted by the parameter m. For m=1, the radar return data are modeled as having an exponential distribution, and an expected value of the data is estimated. A goodness of fit test, such as chi-squared, may be used to compare the empirical distribution of the data and the model distribution. If the test fails, indicating that the data do not have an exponential distribution, then hidden Markov parameters are estimated for m=2. If the test fails for m=2 then the parameters are estimated for m=3, and so on. For $m \geq 2$ the HMM is defined by the state transition parameters, the initial distribution of states, and the distribution of the observations for given states. For $1 \leq i, j \leq m$, the probability of transiting from state i to state j may be denoted by $a_{ij}$. The data generated by state j may be assumed to have a Gaussian probability density with parameter $v_j$, i.e.

$$p<x \mid j> = \frac{1}{2\pi v_j} \exp(-\|x\|^2 / (2v_j)).$$

The initial probability of observing a datum from state j may be denoted by $\pi_j$. The estimation of the values of the hidden Markov parameters $\{v_j, a_{ij}, \pi_j\}$ for $1 \leq i,j \leq m$, where m is the number of states, $v_j$ is the expected intensity of state j, $v_i < v_j$ if i<j, $a_{ij}$ is the probability of transitioning from state i to state j, and $\pi_j$ the initial probability of state j. The HMM parameter estimation may proceed by using the EM algorithm to estimate initial values of $v_j$ and $\pi_j$ for the stationary distribution of the HMM, which is a Gaussian mixture distribution. Initial values for $a_{ij}$ are selected from the interval [0,1] and are preferably based on knowledge of the data. The EM algorithm is then applied to obtain maximum likelihood estimates of the HMM parameters. Alternatively, values of the HMM parameters may be obtained from spatially-temporally contiguous blocks of range bins to supply the initial values for the EM algorithm and applying the EM algorithm to obtain the maximum likelihood parameter estimates.

The estimated HMM parameters are smoothed by a HMM parameter smoother 208 for each block of range bins. The HMM parameters are estimated from data that may contain signal data as well as clutter and noise, however the detection statistic performs best using HMM parameters of the noise component. Parameter smoother 208 is used to reduce the effect of the presence of signal components that may be present in the HMM parameter estimates output from HMM parameter estimator 204. The first step in the smoothing process is to remove the influence of a possible signal component from $v_1$. This is done by replacing the original estimates of $v_1$ for each block of range bins with an order statistic applied to the set of original estimates of $v_1$. If for each block of range bins the replacement value of $v_1$ is below the original value and m=1, then a second state is added by setting $v_2 = v_1$ and defining state transition probabilities $a_{ij}$ for $1 \leq i$, $j \leq 2$ and initial probabilities $\pi_j$ for $1 \leq j \leq 2$. The second step is to impose a lower limit on the ratio $v_2/v_1$. If $v_2/v_1$ is below this limit, then $v_2$ is replaced with a value that satisfies the ratio. For example, the lower limit of the ratio $v_2/v_1$ may be selected to be the empirically derived value of 1.5. Other values of the lower limit may also be used to suit the requirements of a particular application. The third step is to place an upper bound on $a_{11}$ by replacing values of $a_{11}$ that exceed the upper bound with the value of the upper bound and by adjusting the other transition probabilities to maintain the condition expressed in the following formula:

$$\sum_{j=1}^{m} a_{1,j} = 1.$$

Figure 3:
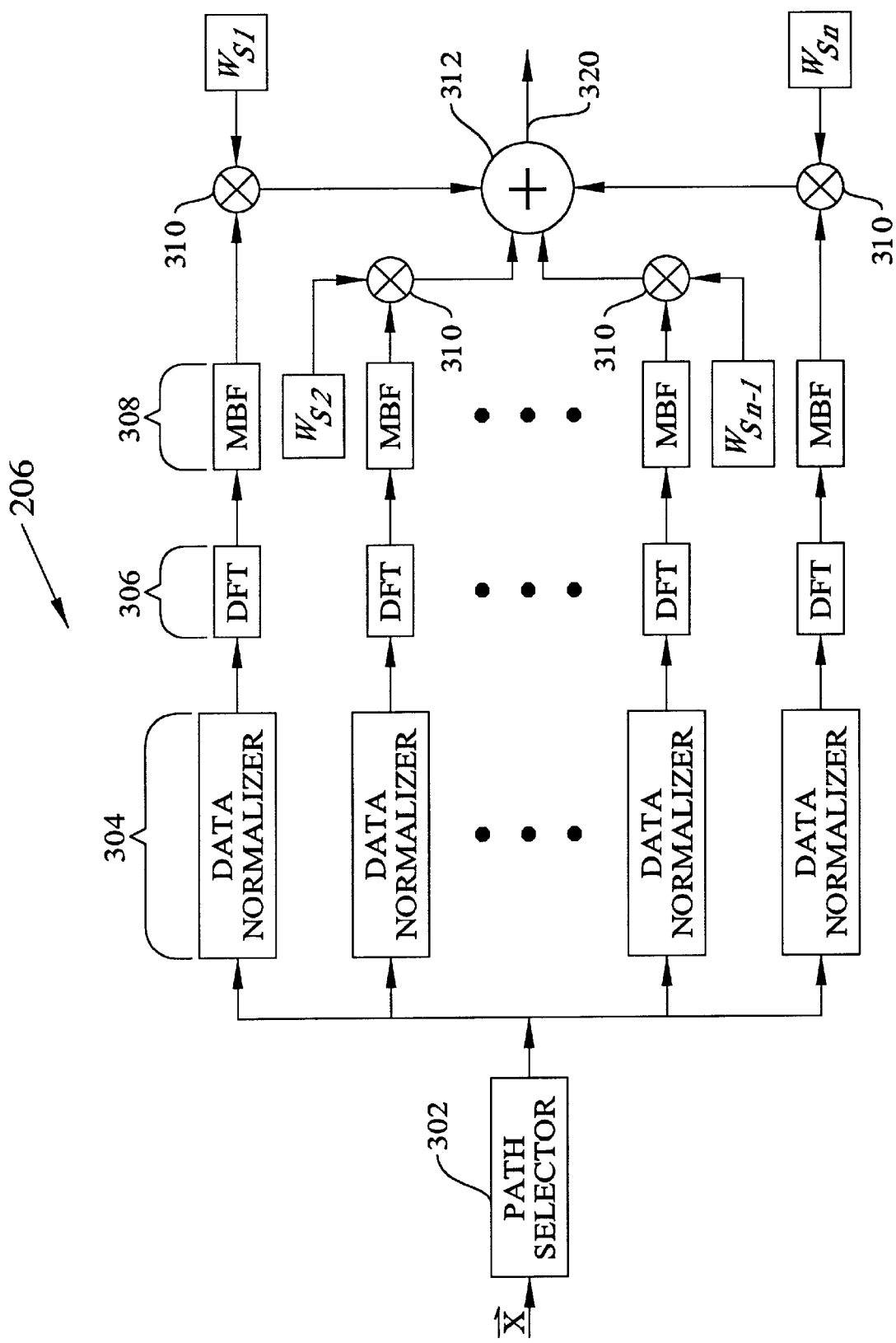
FIG. 3 is a block diagram of a detection statistic calculator of the present invention.

Detection statistic calculator 206 calculates a detection statistic for each range bin as diagrammed in FIG. 3. The block diagram shown in FIG. 3 of detection statistic calculator 206 calculates a detection statistic as follows. Input data $\bar{x} = (x_1, \ldots, x_n)$ is input to path selector 302 for each range bin. $\bar{s} = (s_1, \ldots, s_n)$ represents a path of states having associated vector variances $\bar{v} = (v_{s_1}, \ldots, v_{s_n})$, where $v_{s_j}$ is the variance associated with state $s_j$. A set S of m most likely paths of n terms may be determined using, for example, the log-list Viterbi algorithm. Path selector 302 determines the most likely sequence of states, the second most likely, the third most likely, etc. Each path is input respectively to a data normalizer 304 for each value of m for the m most likely paths of states. Data normalizer 304 normalizes each data block or vector $\bar{x} = (x_1, \ldots, x_n)$ by the corresponding sequence of associated state variances $\bar{v} = (v_{s_1}, \ldots, v_{s_n})$ for state paths $\bar{s} = (s_1, \ldots, s_n)$. A discrete Fourier transform for each normalized data vector $(\bar{x}/\bar{v}_s)$ is computed by a DFT 306.

A modified Bessel function (MBF) 308 applies a modified Bessel function of order zero to the magnitude of each $k^{th}$ Fourier coefficient $(\bar{x}/\bar{v}_s)^\wedge_k$ output from discrete Fourier transform 306. Modified Bessel functions are well known in the art and are typically found in handbooks of mathematical functions and applied analysis textbooks. The modified Bessel function values $I_o(\|(\bar{x}/\bar{v}_s)^\wedge_k\|)$ output from each MBF 308 are multiplied by path dependent weights $w_s$ respectively through multipliers 310. Path dependent weights $w_s$ are defined, for example, by $$w_s = \frac{p<\bar{s}\mid\bar{x}>}{p<\bar{S}\mid\bar{x}>} \exp\left(-\frac{a}{2}\sum_j \frac{1}{V_{s_j}}\right),$$

where a is a nominal estimate of the return signal amplitude and $p<\bar{s}\mid\bar{x}>$ is the probability of state path s given the observation vector $\bar{x}$, and $$p<\bar{S}\mid\bar{x}> = \sum_{\bar{s}\in S} p<\bar{s}\mid\bar{x}>.$$

Sum function 312 adds the weighted products from multipliers 310 and calculates the log of the sum to generate detector output 320.

The detection statistic calculated by detection statistic calculator 206 is vector valued and has a $k^{th}$ coefficient that may be expressed as:

$$LHMC_k(\bar{x}) = \log \sum_{\bar{s}\in S} [w_s I_0(\|((\bar{x}/\bar{v}_s)^\wedge_k\|)]).$$

Detector output 320 is then normalized, thresholded, and displayed in the same manner as the Doppler data in FIG. 1 by adaptive normalizer 106, threshold comparator 108, and display 110 respectively.

Various modifications and variations of the present invention may be possible within the scope of the following claims to practice the invention otherwise than described above.

I claim:

1. A hidden Markov detector comprising:
    a hidden Markov parameter estimator for coupling to an input data source;
    a parameter smoother coupled to the parameter estimator;
    and a detection statistic calculator coupled to the parameter smoother and the input data source.

2. The hidden Markov detector of claim 1 further comprising the input data source.

3. The hidden Markov detector of claim 2 wherein the input data source outputs radar return data.

4. The hidden Markov detector of claim 1 further comprising an adaptive normalizer coupled to the detection statistic calculator.

5. The hidden Markov detector of claim 1 further comprising a threshold comparator coupled to the adaptive normalizer.

6. The hidden Markov detector of claim 1 further comprising a display coupled to the threshold comparator.

7. The hidden Markov detector of claim 1 wherein the detection statistic calculator comprises:

a path selector for selecting a probable state path;

a data normalizer coupled to the path selector for each probable state path respectively;

a discrete Fourier transform coupled to each data normalizer respectively;

a modified Bessel function coupled to each discrete Fourier transform respectively;

a calculation weight multiplier coupled to each modified Bessel function for generating a weighted detection statistic;

and a sum function for adding the weighted detection statistics and calculating a logarithm of their sum to generate a detector output.

8. The hidden Markov detector of claim 7 wherein the detector output $LHMC_k(\bar{x})$ is substantially defined by the equation:

$$LHMC_k(\bar{x}) = \log \sum_{\bar{s} \in S} [w_s I_0(\|(\bar{x}/\bar{v}_s)^\wedge{}_k\|)],$$

wherein:

k is a coefficient index, a is an estimate of signal amplitude, $\bar{x}$ is an input data vector, $\bar{s}$ is a probable path of states vector, S is a set of most probable state paths, $I_0(\ )$ is a modified Bessel function of order zero, $\bar{v}$ is a state variance vector, $(\bar{x}/\bar{v}_s)^\wedge{}_k$ is the $k^{th}$ Fourier coefficient of the normalized input data vector, $$w_s = \frac{p<\bar{s}|\bar{x}>}{p<\bar{S}|\bar{x}>} \exp\left(-\frac{a}{2} \sum_j \frac{1}{V_{s_j}}\right),$$

$p<\bar{s}|\bar{x}>$ is the probability of state path s given the input data vector $\bar{x}$, and $$p<\bar{S}|\bar{x}> = \sum_{\bar{s} \in S} p<\bar{s}|\bar{x}>.$$

9. The hidden Markov detector of claim 7 wherein the parameter smoother performs the following steps:

replacing original estimates of an expected intensity obtained for each block of range bins with an order statistic applied to the set of original estimates of the expected intensity;

adding a second state for the expected intensity estimates and defining corresponding state transition probabilities and initial probabilities for the second state;

replacing the second state expected intensity estimates that exceed an upper limit value with the limit value; and replacing transition probabilities $a_{1,j}$ that exceed an upper bound with the upper bound and adjusting other transition probabilities to maintain a condition expressed by the following formula:

$$\sum_{j=1}^{m} a_{1,j} = 1.$$

* * * * *